US010063416B2

United States Patent
Berezowski et al.

(10) Patent No.: US 10,063,416 B2
(45) Date of Patent: Aug. 28, 2018

(54) BIDIRECTIONAL REDUNDANT MESH NETWORKS

(71) Applicant: Honeywell International Inc., Morristown, NJ (US)

(72) Inventors: Andrew G. Berezowski, Wallingford, CT (US); Jesse J. Otis, North Haven, CT (US); Charles T. Pearson, Northford, CT (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 26 days.

(21) Appl. No.: 14/731,803

(22) Filed: Jun. 5, 2015

(65) Prior Publication Data

US 2016/0360555 A1    Dec. 8, 2016

(51) Int. Cl.
| | |
|---|---|
| *H04J 1/16* | (2006.01) |
| *G06F 11/00* | (2006.01) |
| *G01R 31/08* | (2006.01) |
| *H04L 12/24* | (2006.01) |
| *G08B 25/10* | (2006.01) |
| *H04W 40/00* | (2009.01) |
| *H04L 12/707* | (2013.01) |
| *H04W 84/18* | (2009.01) |

(52) U.S. Cl.
CPC .......... *H04L 41/0836* (2013.01); *G08B 25/10* (2013.01); *H04W 40/00* (2013.01); *H04L 45/22* (2013.01); *H04L 45/24* (2013.01); *H04W 84/18* (2013.01)

(58) Field of Classification Search
CPC ... H04W 84/18; H04W 84/00; H04W 40/246; H04L 41/0893; H04L 41/14
See application file for complete search history.

(56) References Cited

U.S. PATENT DOCUMENTS

| | | | | |
|---|---|---|---|---|
| 7,619,538 | B1 * | 11/2009 | Zarian | G08B 7/066 340/326 |
| 2002/0055989 | A1 * | 5/2002 | Stringer-Calvert | H04L 12/24 709/220 |
| 2003/0088696 | A1 * | 5/2003 | McCanne | H04L 12/1836 709/238 |
| 2005/0074019 | A1 * | 4/2005 | Handforth | H04L 12/44 370/406 |
| 2007/0044539 | A1 * | 3/2007 | Sabol | G06Q 10/06 73/19.01 |
| 2008/0137532 | A1 | 6/2008 | Namburi et al. | |
| 2008/0192713 | A1 * | 8/2008 | Mighani | H04W 84/00 370/338 |

(Continued)

FOREIGN PATENT DOCUMENTS

| | | |
|---|---|---|
| EP | 2 020 787 A1 | 2/2009 |
| EP | 2 677 835 A1 | 12/2013 |

OTHER PUBLICATIONS

Extended European search report for corresponding EP patent application 16171186.6, dated Jul. 21, 2016.

*Primary Examiner* — Maharishi V Khirodhar

(74) *Attorney, Agent, or Firm* — Husch Blackwell LLP

(57) ABSTRACT

A redundant mesh communications network uses multiple controllers or controller gateways to route messages and to monitor the integrity of wired and wireless mesh system elements. Such multiple control units and multiple paths provide various redundant communications solutions, thereby avoiding a single point of failure in the network.

15 Claims, 10 Drawing Sheets

(56) References Cited

U.S. PATENT DOCUMENTS

| | | | |
|---|---|---|---|
| 2008/0253386 A1 | 10/2008 | Barum | |
| 2009/0268674 A1 | 10/2009 | Liu et al. | |
| 2010/0057541 A1* | 3/2010 | Bonner | G06Q 30/0261 |
| | | | 705/26.1 |
| 2010/0271989 A1* | 10/2010 | Chernoguzov | G05B 19/41855 |
| | | | 370/310 |
| 2010/0313148 A1* | 12/2010 | Hochendoner | G06F 3/0481 |
| | | | 715/759 |
| 2011/0019651 A1* | 1/2011 | Fulknier | H04L 45/00 |
| | | | 370/338 |
| 2013/0343202 A1 | 12/2013 | Huseth et al. | |
| 2014/0198674 A1 | 7/2014 | Mandiganal | |
| 2015/0042484 A1 | 2/2015 | Bansal et al. | |
| 2015/0156815 A1 | 6/2015 | Pang et al. | |
| 2015/0256401 A1* | 9/2015 | Zinger | H04L 41/14 |
| | | | 370/401 |
| 2015/0373553 A1* | 12/2015 | Chiba | H04W 4/006 |
| | | | 370/310 |
| 2017/0366408 A1* | 12/2017 | Kyllonen | H04L 41/12 |

* cited by examiner

BIDIRECTIONAL REDUNDANT MESH NETWORKS

FIELD

The application pertains to bidirectional mesh networks that provide redundant communications paths. More particularly, the application pertains to such networks that incorporate multiple controllers or controller gateways and multiple communications paths.

BACKGROUND

Systems are known to protect people and assets within secured areas. Such systems are typically based upon the use of one or more wireless detectors that respond to threats within a secured area.

Threats to people and assets may originate from any of a number of different sources. For example, a fire may kill or injure occupants who have become trapped by a fire in a home. Similarly, carbon monoxide from a fire may kill people in their sleep.

Alternatively, an unauthorized intruder, such as a burglar, may present a threat to assets within the secured area. Intruders have also been known to injure or kill people living within the secured area.

In the case of intruders, detectors or sensors may be placed in different areas based upon respective uses of those areas. For example, if people are present during some portions of a normal day and not at other times, then some detectors may be placed along a periphery of a space to provide protection while the space is occupied, and additional sensors may be placed within an interior of the space and used when the space is not occupied.

In most cases, threat detectors are connected to a local control panel. In the event of the threat detected via one of the threat detectors, the local control panel may sound a local audible alarm. The local control panel may also send a signal to a displaced monitoring station.

While conventional security systems using wireless detectors work well, they are sometimes subject to unexpected failures. For example, fire and security systems that employ mesh networks with single controllers have a single point of failure that could result in lost communications to one or more areas protected by a system. A need exists for better methods and apparatuses for diagnosing such systems.

DETAILED DESCRIPTION

Figure 1:
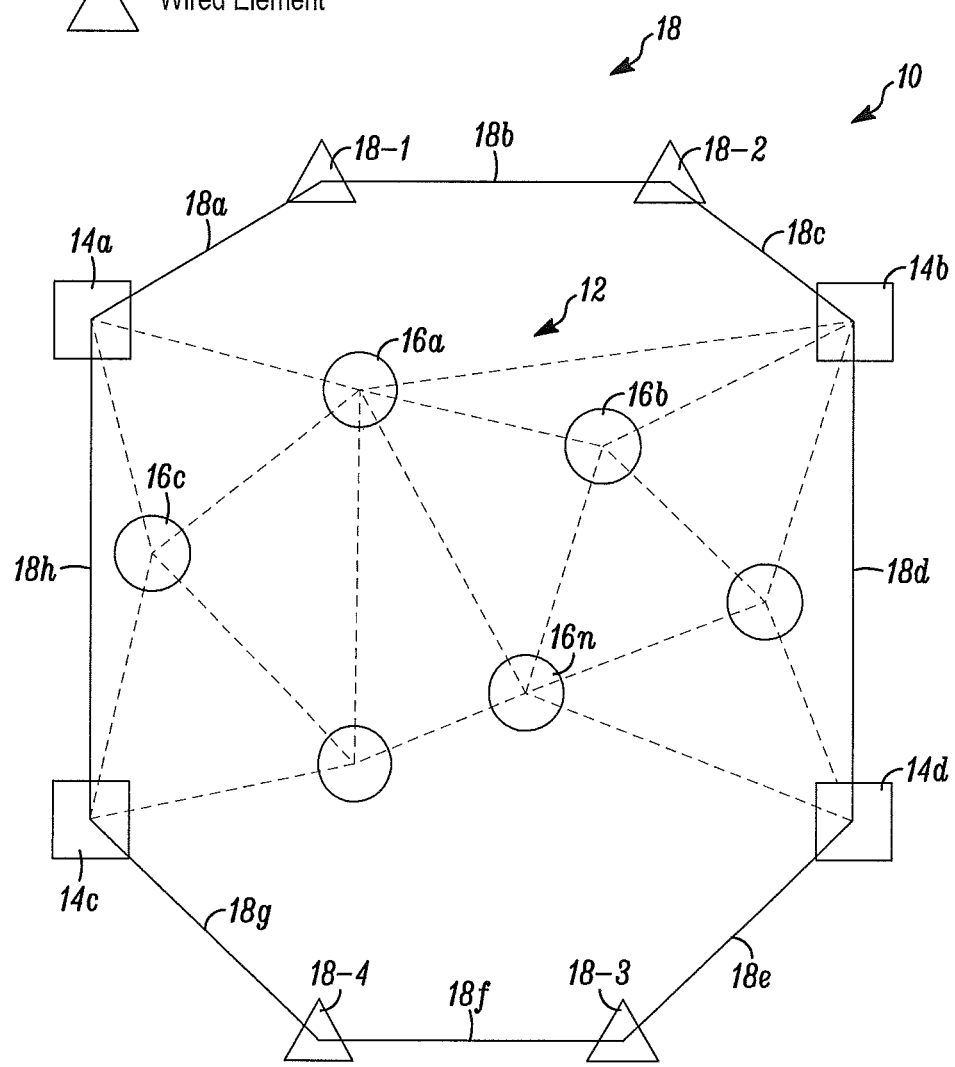
FIG. 1 illustrates a block diagram of a first system in accordance herewith.

While disclosed embodiments can take many different forms, specific embodiments thereof are shown in the drawings and will be described herein in detail with the understanding that the present disclosure is to be considered as an exemplification of the principles thereof and the best mode of practicing the same and is not intended to limit the application or the claims to the specific embodiment illustrated.

Systems in accordance herewith provide redundant communications pathways in fire and security systems employing mesh networks. Furthermore, since fire and security systems may use a hybrid combination of wired networks and wireless mesh elements, in another configuration, wired and wireless portions can be integrated while providing the redundant communications pathways throughout a system.

In one aspect, each wireless mesh network can contain multiple controllers and a plurality of mesh elements. The plurality of mesh elements can include, without limitation, detectors of various types, including security related detectors, such as glass break detectors, position detectors, motion detectors, or door detectors. Other detector types include ambient condition detectors, such as fire detectors, gas detectors, thermal detectors, or water or humidity detectors.

The multiple controllers may be used to interface the plurality of mesh elements of the mesh networks to wired elements of the system. Each of the multiple controllers determines parent/child relationships for the plurality of mesh elements and communicates with all of the plurality of mesh elements via a bidirectional time slotted or frequency allocation method. Such time slotted or frequency allocation processes, as would be understood by those of skill, are unique to each of the mulitiple controllers for a given mesh network. As a result, each of the multiple controllers receives communications from all network elements redundantly.

Each of the multiple controllers in a given mesh network will retransmit any communication received from transmitting mesh elements to all of the plurality of mesh elements. In that way, all of the plurality of mesh elements receive all communications redundantly. System communications are unaffected by a failure of all but one of the multiple controllers.

FIG. 1 illustrates a first embodiment 10. Here, a message originating in a wireless mesh network 12 from detectors or other wireless elements, such as 16a, 16b . . . 16n, is usually received by each controller, such as 14a, 14b, 14c, 14d. Such wireless controllers, such as 14a . . . 14d, in turn, retransmit the message to the wireless elements, such as 16i, of the wireless mesh network. The message is then transmitted on a wired path or paths, such as 18i, if the message has not already been received or transmitted on that path or paths. This eliminates circular message paths.

In the event one of the wireless controllers, such as 14i, does not receive the message wirelessly within a system propagation time, that controller sends the message received by wire, such as from the wired path 18i, to the wireless elements with which it is in communication. System communications are unaffected by a failure of all but a last one of the wireless controllers.

Figure 2:
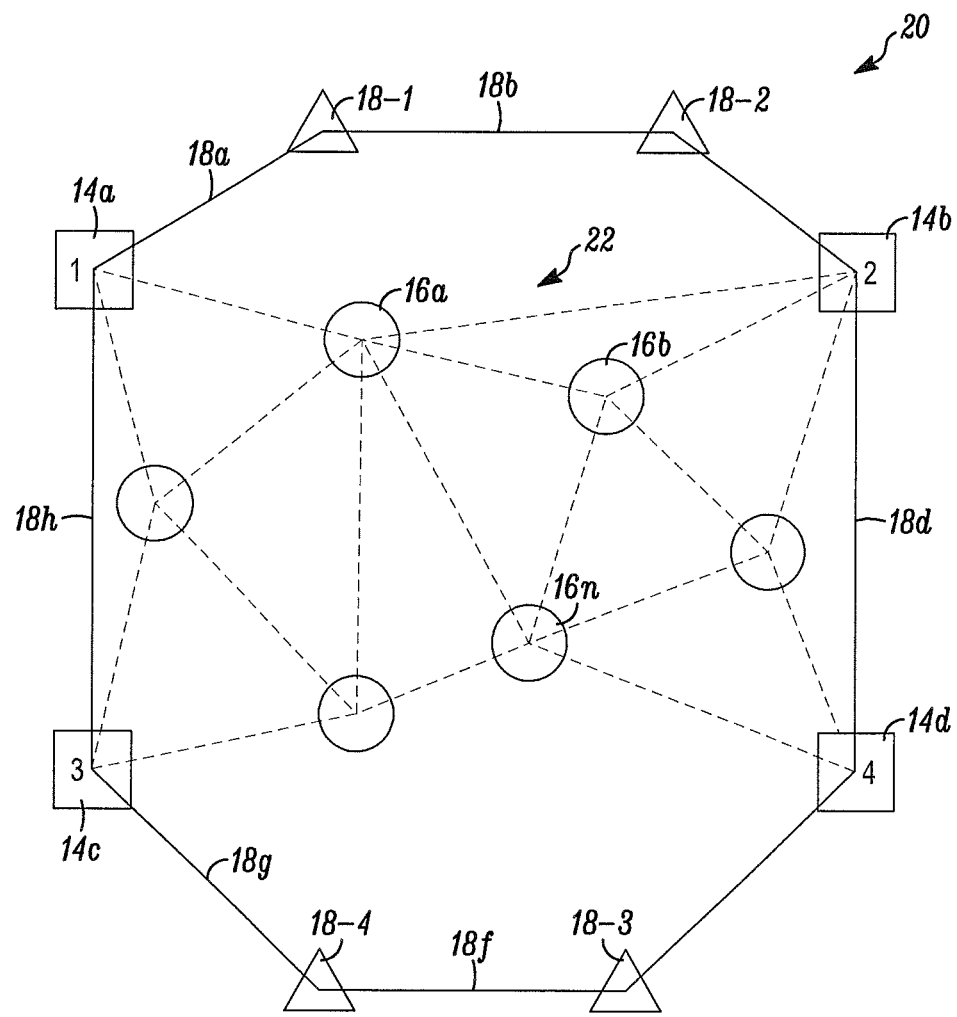
FIG. 2 illustrates a block diagram of a second system in accordance herewith.

In another embodiment 20, as illustrated in FIG. 2, the wireless mesh network, such as 22, will contain multiple ones of the wireless controllers and a number of the wireless elements. It will be understood that the wireless elements and the wireless controllers of a type previously described above have been assigned an identical identification numeral that corresponds to that of FIG. 1. They need not be discussed further, except as set forth below.

The wireless controllers may be used to interface the wireless mesh network 22 to wired elements 18-1, 18-2, 18-3, 18-4 of the system 20. Each of the wireless controllers, such as 14a . . . 14d, determines parent/child relationships for the wireless elements, such as 16i, relative to itself as if it were a master of the system communications of the wireless mesh network.

As indicated in FIG. 2, a hierarchy of the wireless controllers 14a . . . 14d can be established so that only one controller communicates with all of the wireless elements. The system communications can be effected, without limitation, using a bidirectional time slotted or frequency allocation method.

When the message is received by any of the wireless controllers, such as 14a . . . 14d, from one or more of the wireless elements, such as 16i, including redundant controllers, a particular one of the wireless controllers with a highest priority, such as 14a, retransmits the message to all elements of the wireless mesh network 22, including the redundant controllers. Advantageously, with this process, all elements of the wireless mesh network 22 receive all messages from all of the wireless elements.

Health messages within the wireless mesh network 22 are transmitted periodically. When one or more the health messages are missed, not received, or responded to by an element within the wireless mesh network, that element will switch to a next highest controller parent/child relationship and time slotted or frequency allocated scheme.

The particular one of the wirless controllers with the highest priority retransmits the message received to the wireless elements if it has not already done so successfully and then transmits the message on the wired path if the message has not already been received or transmitted on that path. Lower priority controllers transmit the message on the wired path if the message has not already been received or transmitted on that path. This eliminates circular message paths.

The wireless controllers that receive the message on the wired path, such as 18a . . . 18n, transmit the message on other wired paths if the message has not already been received or transmitted on that wired path. For added redundancy, the lower priority controllers, such as 14b, 14c, 14d, may retransmit the message received on the wired path, such as 18i, wirelessly to the particular one of the wireless controllers with the highest priority.

The system communications of the system 20 are unaffected by the failure of all but the last one of the wireless controllers operating. They also exhibit reduced radio traffic requirements relative to the embodiment 10 of FIG. 1.

Figure 3:
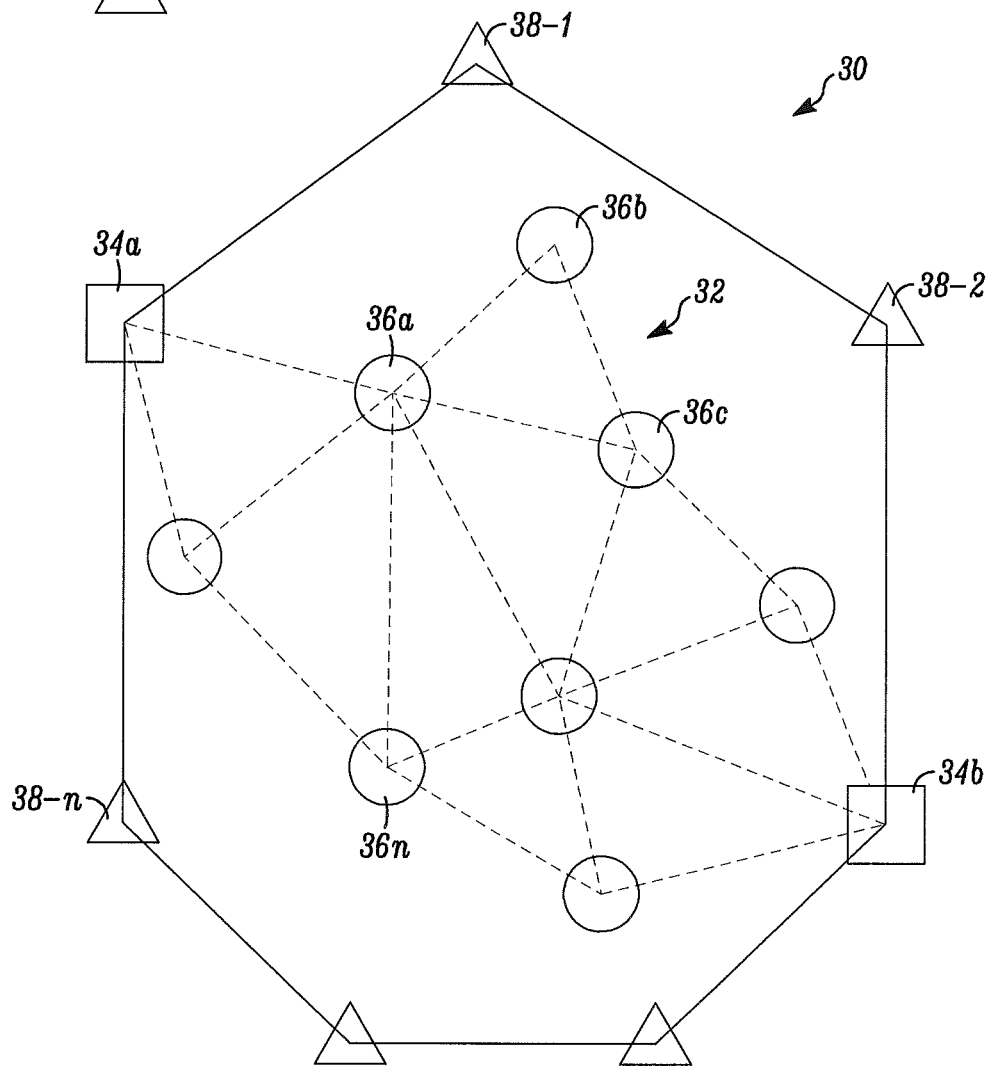
FIG. 3 illustrates a block diagram of a third system in accordance herewith.
Figure 4:
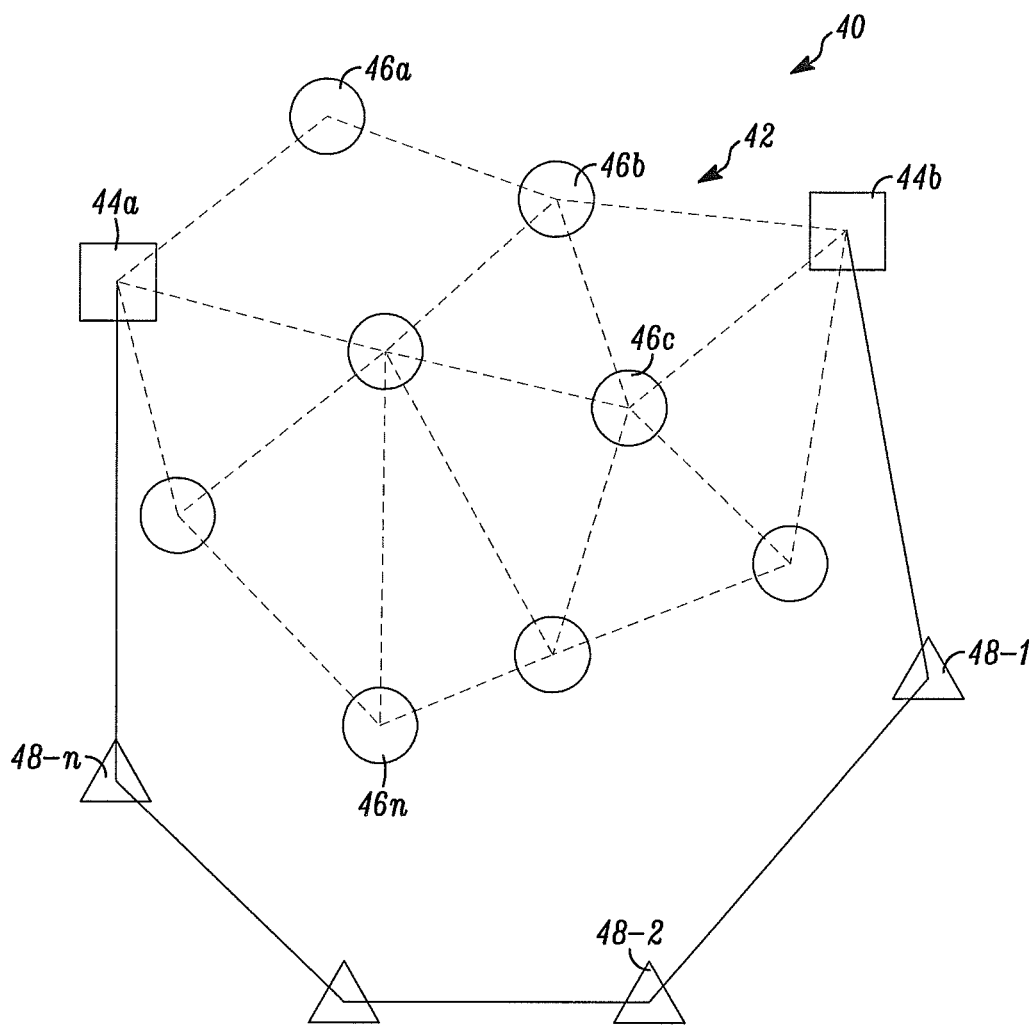
FIG. 4 illustrates a block diagram of a fourth system in accordance herewith.

In other embodiments 30, 40, as illustrated in FIG. 3 and FIG. 4, the wireless mesh network, such as 32, 42, contains two of the wireless controllers, such as 34a, 34b or 44a, 44b, and a number of the wireless elements, such as 36a . . . 36n or 46a . . . 46n. The wireless controllers may be used to interface the wireless mesh network and the wireless elements to the wired elements, such as 38-1 . . . 38-n or 48-1 . . . 48-n, of a respective system. The two of the wireless controllers arrange a mesh parent/child structure such that one of the wireless controllers assumes a first time slot and another of the wireless controllers assumes a last time slot of a time slotted communication scheme. The wireless controllers arrange the wireless mesh network such that each of the wireless elements has a redundant communication path to both of the wireless controllers.

Each of the wireless controllers in the wireless mesh network may retransmit any communication received from transmitting ones of the wireless elements to all of the wireless elements. In that way, all of the wireless elements could receive all communications redundantly. The message originating in the wireless mesh network is retransmitted to the wireless elements by the particular one of the wireless controllers that first receives it.

The wireless controllers that receive the message transmit the message on the wired paths if the message has not already been received or transmitted on those wired paths. The system communications are unaffected by the failure of any one the wireless controllers.

Figure 5:
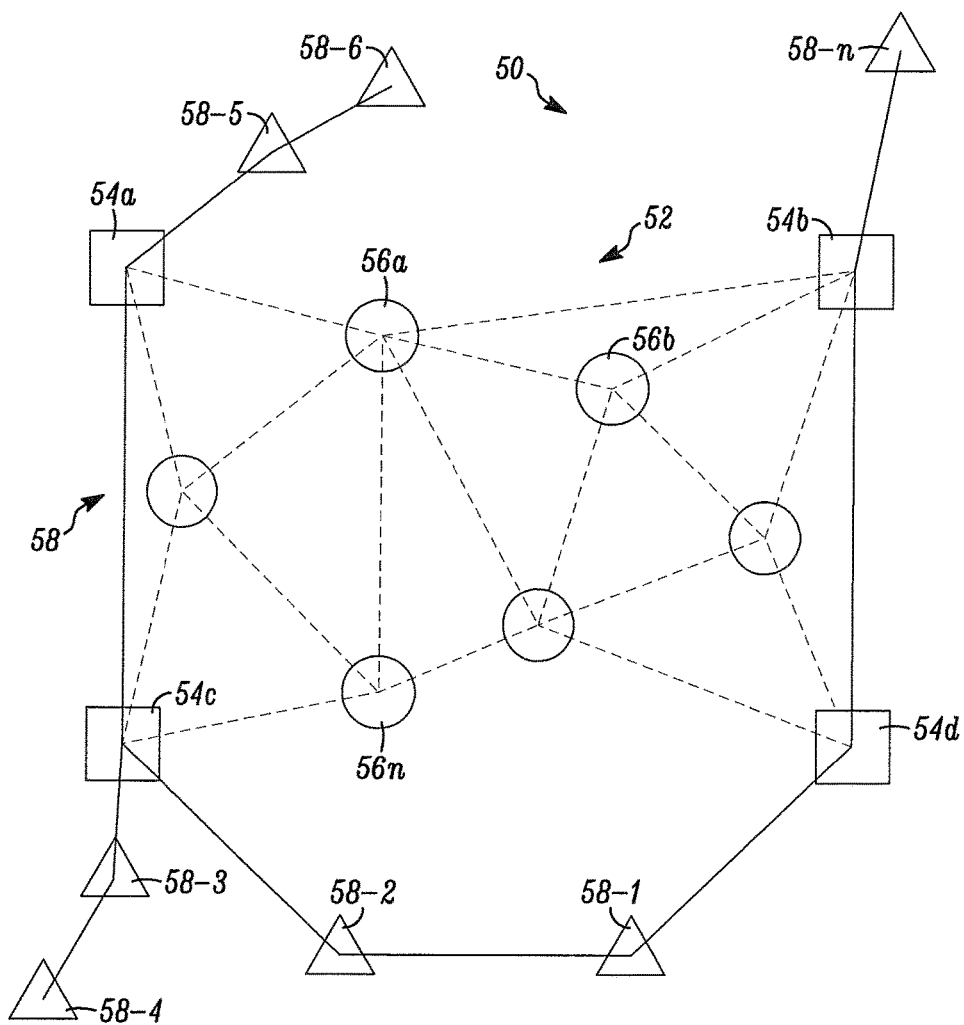
FIG. 5 illustrates a block diagram of a fifth system in accordance herewith.
Figure 6:
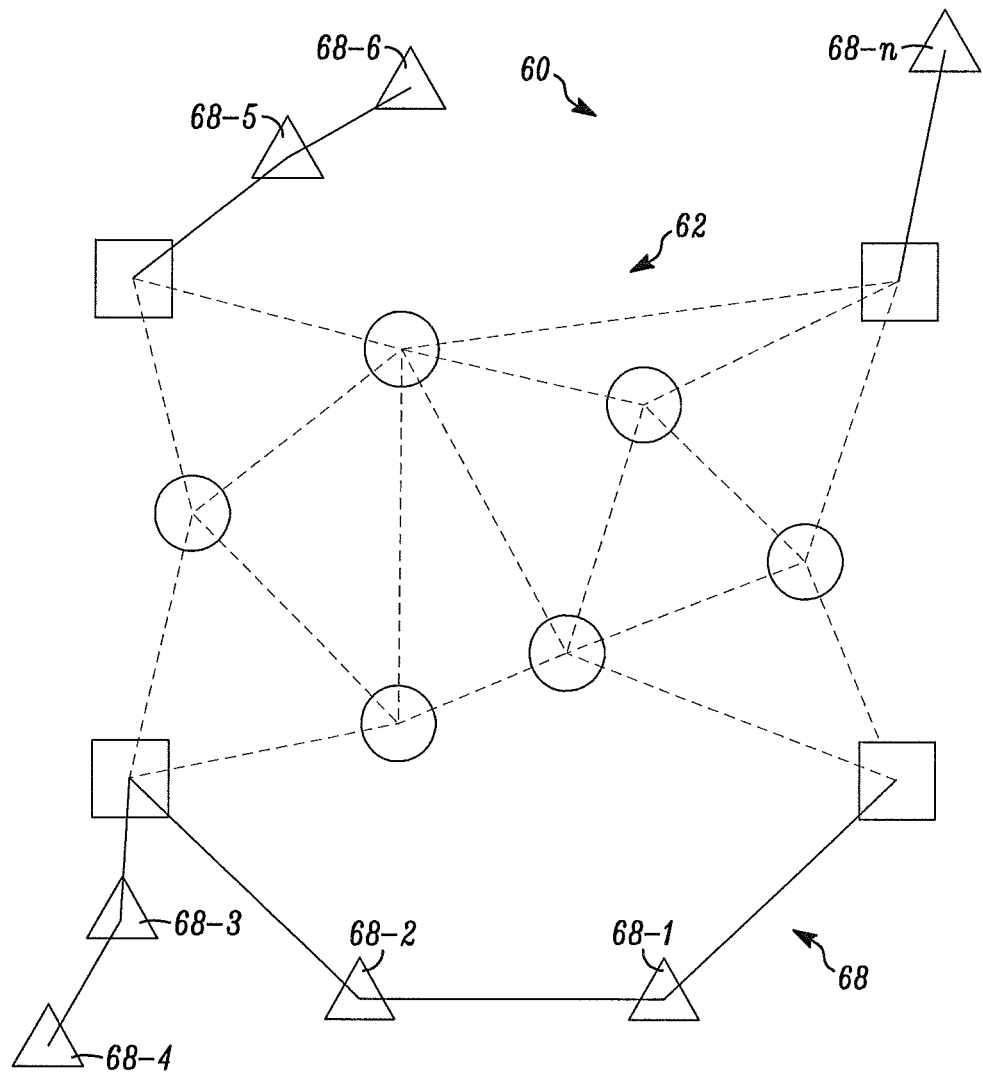
FIG. 6 illustrates a block diagram of a sixth system in accordance herewith.

Variations of the embodiments including branches and non-redundant wire segments 58, 68 are also possible, as illustrated in FIG. 5 in a network 50 and in FIG. 6 in a network 60.

Figure 7:
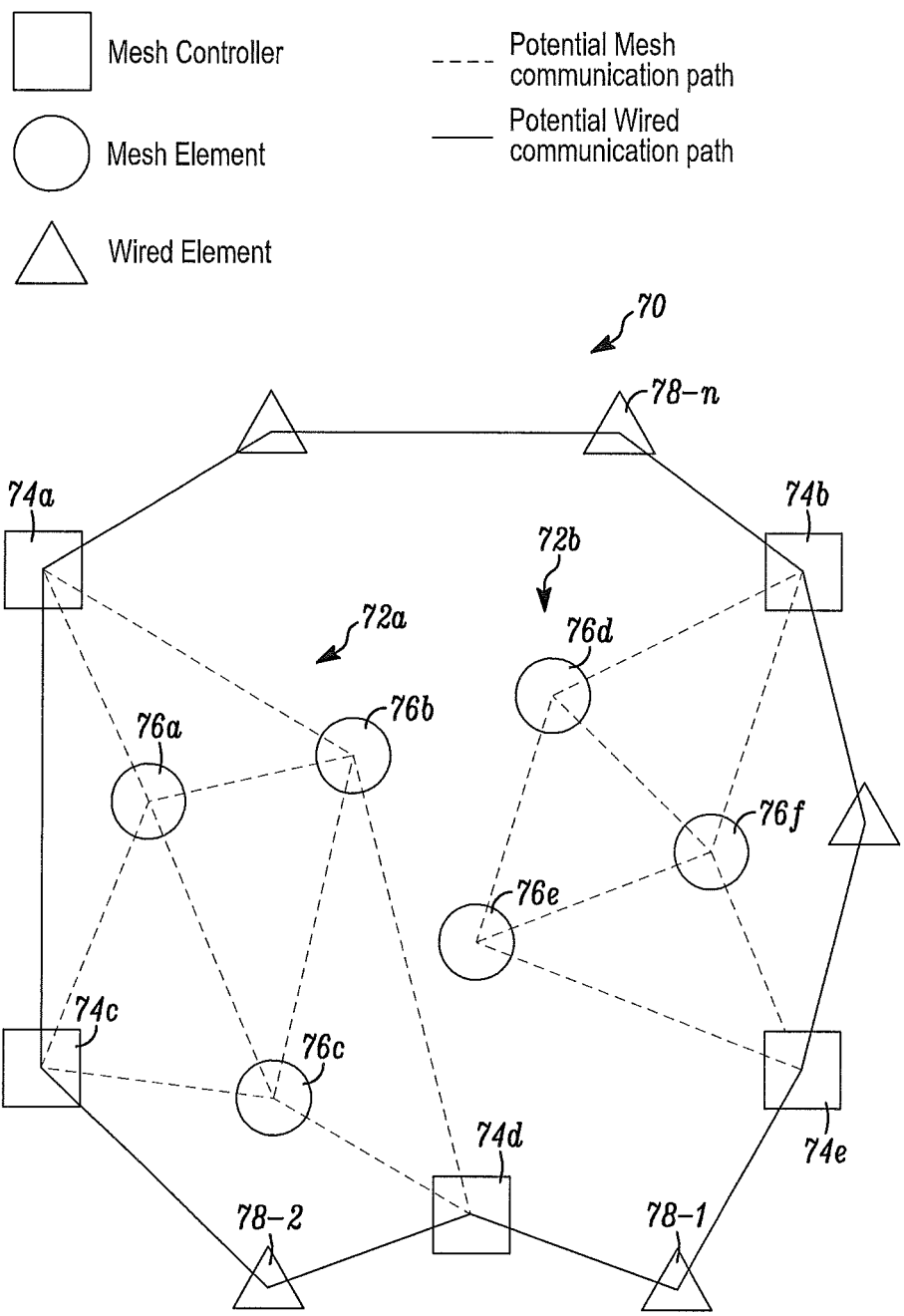
FIG. 7 illustrates a block diagram of a seventh system in accordance herewith.
Figure 8:
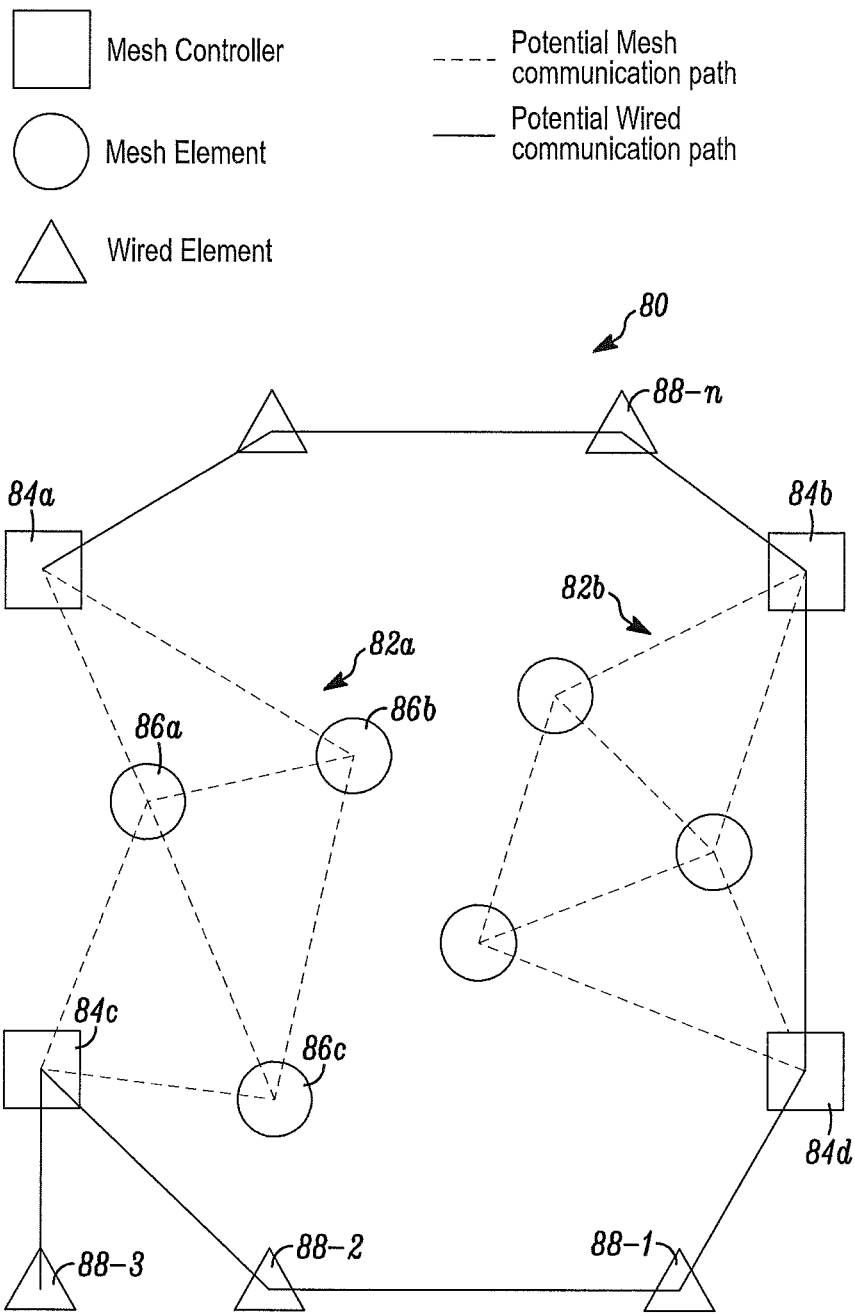
FIG. 8 illustrates a block diagram of an eighth system in accordance herewith.

Additional embodiments may include multiple mesh networks 72a, 72b or 82a, 82b in various combinations, as illustrated in FIG. 7 and FIG. 8.

In summary, the architecture of a network may be integrated into a peer-to-peer network as in the networks illustrated in FIGS. 1-8. Such configurations are applicable to commercially available or installed networks, such as the NOTIFIER Brand Fire-Network (NFN), the NOTIFIER Brand Digital Audio Loop (DAL), the FIRE-LITE Brand Lite Connect Network, or Gamewell Fire Control-type ring networks in which each controller/element includes a transceiver in direct communication with one or two peer elements via wire or fiber. The architecture may also be applicable for use in a network of multiple I/O devices as mesh elements with multiple control panels as mesh controllers for Safety Integrity Level (SIL) rated installations.

Advantageously, the above embodiments can be expected to meet the requirements of National Fire Protection Association (NFPA) Proposed Standard 72 2016 Class Designations A, N, and X. Further, the above embodiments can be incorporated into systems required to meet the SIL requirements as a measure of reliability and/or risk reduction. Examples include:

ANSI/ISA S84 (Functional safety of safety instrumented systems for the process industry sector)
IEC EN 61508 (Functional safety of electrical/electronic/programmable electronic safety related systems)
IEC 61511 (Safety instrumented systems for the process industry sector)
IEC 61513 (Nuclear Industry)
EN 50402 (Fixed gas detection systems).

Figure 9:
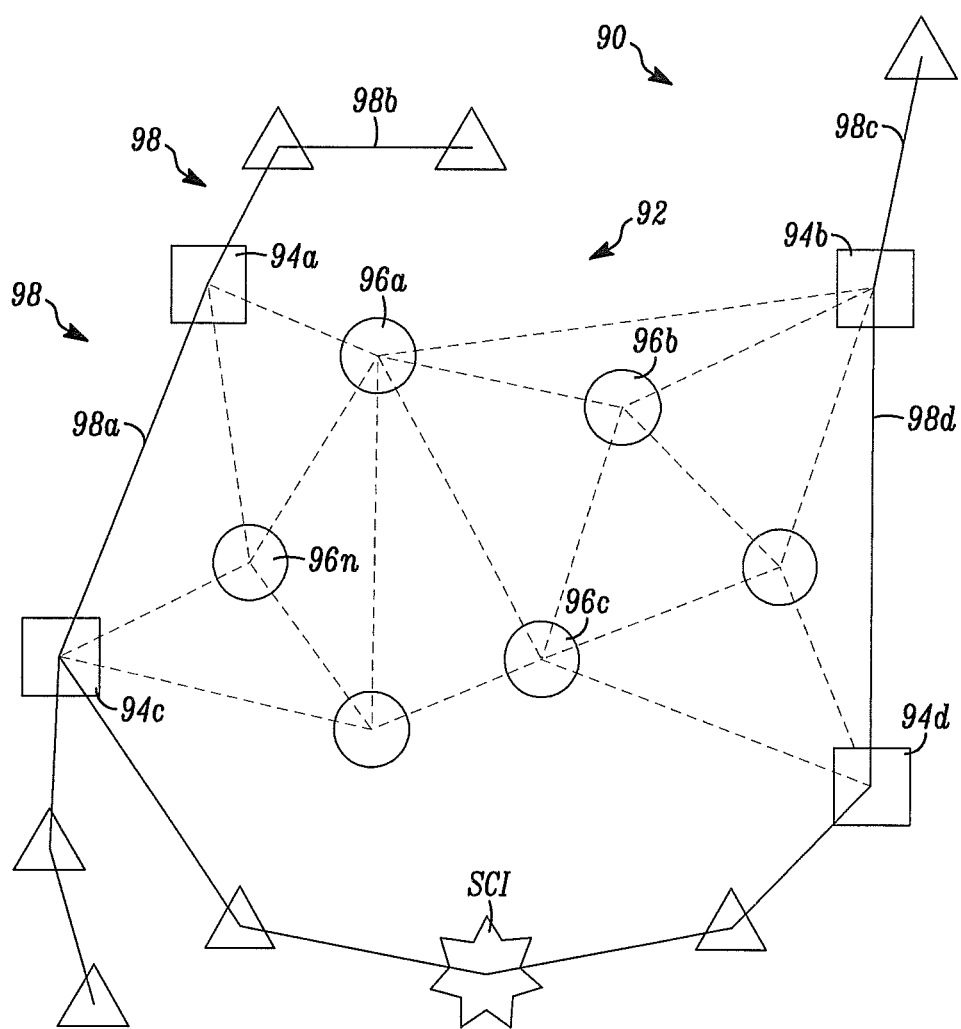
FIG. 9 illustrates a block diagram of a ninth system in accordance herewith.
Figure 10:
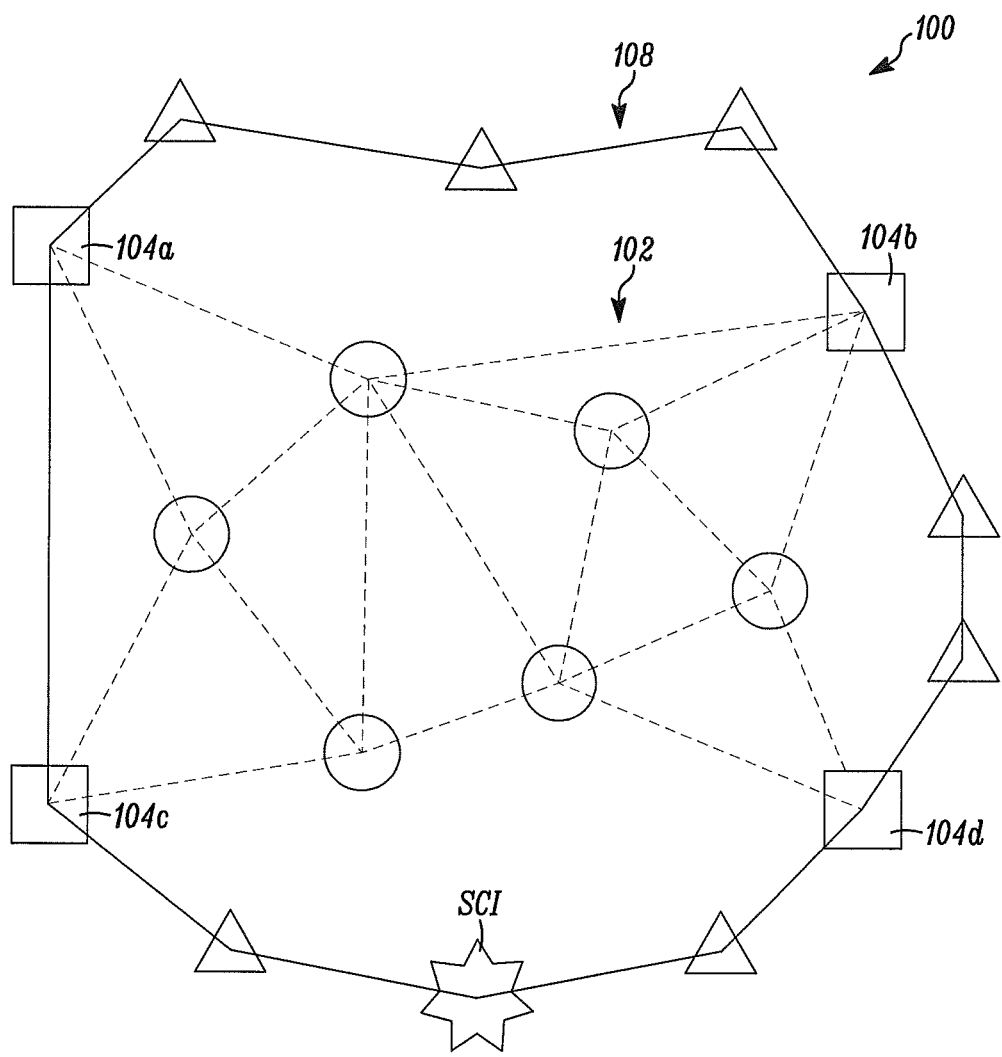
FIG. 10 illustrates a block diagram of a tenth system in accordance herewith.

The architecture of a network may also be integrated into a bus network as in the networks 90, 100 of FIG. 9 and FIG. 10. In those embodiments, each of the wireless elements 92, 102 is communicating with multiple ones of the wireless controllers 94, 104 that are connected to the same system controller SCI via a multi-path bus connection 98, 108. This is applicable to signaling line circuit (SLC) networks or bus communication networks.

In summary, embodiments hereof advantageously avoid single point network failures. Also, networks can be used as bidirectional transport mediums for messages in larger mixed medium networks.

From the foregoing, it will be observed that numerous variations and modifications may be effected without departing from the spirit and scope hereof. It is to be understood that no limitation with respect to the specific apparatus illustrated herein is intended or should be inferred. It is, of course, intended to cover by the appended claims all such modifications as fall within the scope of the claims. Further, logic flows depicted in the figures do not require the particular order shown or sequential order to achieve desirable results. Other steps may be provided, steps may be eliminated from the described flows, and other components may be added to or removed from the described embodiments.

The invention claimed is:

1. An apparatus comprising:
   a plurality of controllers, wherein each of plurality of controllers communicates with at least one other controller of the plurality of controllers via a wired medium; and
   a plurality of wireless elements that communicates with the plurality of controllers via a wireless medium,
   wherein, when a first controller of the plurality of controllers receives a first message from a first wireless element of the plurality of wireless elements, the first controller transmits the first message to the plurality of wireless elements via the wireless medium,
   wherein, when the first controller receives the first message from the first wireless element, the first controller determines whether the first message has been transmitted to the plurality of controllers via the wired medium, and
   wherein, when the first controller determines that the first message has not been transmitted to the plurality of controllers via the wired medium, the first controller retransmits the first message to the plurality of controllers via the wired medium.

2. The apparatus as in claim 1 wherein the plurality of wireless elements comprises first and second wireless mesh communications networks.

3. The apparatus as in claim 1 wherein each of the plurality of controllers includes respective circuitry to route wireless messages via the wired medium to the plurality of controllers, thereby avoiding a single point of failure.

4. The apparatus as in claim 1 wherein some members of the plurality of controllers communicate only with a single other member of the plurality of controllers.

5. The apparatus as in claim 1 wherein at least some of the plurality of wireless elements are selected from a class that includes at least glass break detectors, position detectors, motion detectors, door detectors, fire detectors, gas detectors, thennal detectors, water or humidity detectors, control panels, system annunciation panels, smoke control panels, audio panels, visual indication panels, and audible or visual output devices.

6. The apparatus as in claim 1 further comprising a monitoring system control panel coupled to at least one of the plurality of controllers.

7. The apparatus as in claim 1 further comprising circuitry to assign a respective priority value to each of the plurality of controllers, wherein a highest priority one of the plurality of controllers communicates with all members of the plurality of wireless elements.

8. The apparatus as in claim 7 wherein health assessing messages are transmitted among members of the plurality of wireless elements or the plurality of controllers.

9. A method comprising:
   providing a plurality of wireless elements;
   providing a plurality of controllers;
   providing a wireless communications path between a first controller of the plurality of controllers and the plurality of wireless elements;
   providing a wired communications path between the plurality of controllers;
   the first controller receiving a first message from a first wireless element of the plurality of wireless elements;
   the first controller transmitting the first message to the plurality of wireless elements via the wireless communications path in response to receiving the first message;
   the first controller determining whether the first message has been transmitted to the plurality of controllers via the wired communications path in response to receiving the first message; and
   when the first controller determines that the first message has not been transmitted to the plurality of controllers via the wired communications path, the first controller retransmitting the first message to the plurality of controllers via the wired communications path.

10. The method as in claim 9 further comprising providing communications on the wired communications path with the first controller.

11. The method as in claim 10 further comprising coupling the first wireless element to the plurality of controllers via multiple paths.

12. The method as in claim 9 further comprising establishing a respective priority for each of the plurality of controllers, wherein a highest priority one of the plurality of controllers carries out communications with the plurality of wireless elements.

13. A monitoring system comprising:
   a plurality of mesh elements;
   a plurality of inter-element communications links; and
   first and second mesh controllers,
   wherein the first and second mesh controllers are in wireless communication with the plurality of mesh elements via a first group of the plurality of inter-element communications links,
   wherein the first and second mesh controllers are in wired communication via a second link of the plurality of inter-element communications links,
   wherein, when the first mesh controller receives a first message from a first mesh element of the plurality of mesh elements, the first mesh controller transmits the first message to the plurality of mesh elements via the first group of the plurality of inter-element communications links,
   wherein, when the first mesh controller receives the first message from the first mesh element, the first mesh controller determines whether the first message has been transmitted to the second mesh controller via the second link, and
   wherein, when the first mesh controller determines that the first message has not been transmitted to the second mesh controller via the second link, the first mesh controller retransmits the first message to the second mesh controller via the second link.

14. The monitoring system as in claim 13 wherein the first and second mesh controllers communicate with each other via at least two different communications links of the plurality of inter-element communication links, wherein the first group of the plurality of inter-element communications links comprises wireless paths, and wherein the second link comprises a wired path.

15. The monitoring system as in claim 14 wherein the wired path extends continuously between the first and second mesh controllers.

* * * * *